United States Patent
Apel et al.

(10) Patent No.: US 9,762,783 B2
(45) Date of Patent: Sep. 12, 2017

(54) IMAGER MODULE AND METHOD FOR MANUFACTURING AN IMAGER MODULE

(71) Applicant: Robert Bosch GmbH, Stuttgart (DE)

(72) Inventors: Uwe Apel, Neckartailfingen (DE); Nikolai Bauer, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 211 days.

(21) Appl. No.: 14/651,442

(22) PCT Filed: Oct. 23, 2013

(86) PCT No.: PCT/EP2013/072114
§ 371 (c)(1),
(2) Date: Jun. 11, 2015

(87) PCT Pub. No.: WO2014/095130
PCT Pub. Date: Jun. 26, 2014

(65) Prior Publication Data
US 2015/0334278 A1 Nov. 19, 2015

(30) Foreign Application Priority Data
Dec. 18, 2012 (DE) .......... 10 2012 223 509

(51) Int. Cl.
*H04N 5/225* (2006.01)
*G02B 7/02* (2006.01)
*B60R 1/00* (2006.01)
*G03B 17/12* (2006.01)
*G03B 43/00* (2006.01)

(52) U.S. Cl.
CPC ............. *H04N 5/2253* (2013.01); *B60R 1/00* (2013.01); *G02B 7/02* (2013.01); *G02B 7/023* (2013.01); *G02B 7/025* (2013.01); *G02B 7/026* (2013.01); *G03B 17/12* (2013.01); *G03B 43/00* (2013.01); *H04N 5/2252* (2013.01);
(Continued)

(58) Field of Classification Search
CPC ...... H04N 5/2253; H04N 5/2252; B60R 1/00; G02B 7/02; G02B 7/023
See application file for complete search history.

(56) References Cited

U.S. PATENT DOCUMENTS

| 6,122,115 A | 9/2000 | Plummer et al. |
| 6,511,253 B1 | 1/2003 | Grimes et al. |

(Continued)

FOREIGN PATENT DOCUMENTS

| DE | 69628120 T2 | 10/2003 |
| DE | 102006000641 A1 | 7/2007 |

(Continued)

*Primary Examiner* — Nam Pham
(74) *Attorney, Agent, or Firm* — Norton Rose Fulbright US LLP; Gerard Messina

(57) ABSTRACT

An imager module for a camera system includes a sensor carrier, an image sensor accommodated on the sensor carrier, and an objective lens. An elastically deformable clamping device is tensioned between the objective lens and the sensor carrier. The clamping device is elastically deformable, in particular between regions of the outer surface of the objective lens and the supporting ribs of a receiving depression in a plane that extends essentially orthogonally to an axis of symmetry of the objective lens or an optical axis of the imager module.

22 Claims, 6 Drawing Sheets

(52) U.S. Cl.
CPC ......... *H04N 5/2254* (2013.01); *H04N 5/2257* (2013.01); *Y10T 29/49828* (2015.01)

(56) References Cited

U.S. PATENT DOCUMENTS

| | | | |
|---|---|---|---|
| 2005/0007485 A1* | 1/2005 | Vook | H04N 5/2254 348/345 |
| 2005/0104995 A1* | 5/2005 | Spryshak | G02B 7/026 348/360 |
| 2012/0105983 A1 | 5/2012 | Huang | |

FOREIGN PATENT DOCUMENTS

| | | |
|---|---|---|
| EP | 1736810 A1 | 12/2006 |
| JP | 2004333615 A | 11/2004 |

* cited by examiner

IMAGER MODULE AND METHOD FOR MANUFACTURING AN IMAGER MODULE

BACKGROUND

Camera systems used in vehicles generally have a camera housing, a circuit substrate including additional electronic components, and an imager module that is contacted by the circuit substrate. The imager module itself generally includes an image sensor, a sensor carrier for mounting the image sensor, and an objective lens. The objective lens is mounted to the sensor carrier via a lens holder, for example. Thus, the image sensor and the objective lens define an optical axis. The image sensor can be mounted on the sensor carrier directly or via a chip carrier and is contacted via the sensor carrier, for example via circuit-board conductors of the sensor carrier that lead to the circuit substrate.

An imager module of this kind is first mounted as a unit and focused by adjusting the objective lens along the optical axis relative to the image sensor. The prefabricated imager module can then be subsequently contacted by the circuit substrate and accommodated in the camera housing.

The objective lens can first be laterally positioned via a clearance fit relative to the tube of the lens holder. The objective lens is axially positioned relative to the lens holder and is, therefore, focused, for example, by frictional action or through the use of a thread pitch. The rear lens space, i.e., the optical space between the rear lens of the objective lens and the image sensor, is sealed against the gap of the clearance fit, for example by a sealing ring or O-ring seal.

Generally, thread formations are relatively costly, however. Furthermore, a thread must always be dimensioned with clearance in order to prevent a seizing/blocking thereof during focusing. The clearance, in turn, can lead to a misalignment of the objective lens in a subsequent processing step and thus to a loss of focus. The thread formation along with the longitudinal position also define the angular position of the lens system, so that a suitable azimuth orientation, i.e., angular position relative to the optical axis or axis of symmetry can be selected without supplementing the longitudinal positioning. Screw-fastening processes are also more time-consuming than purely linear movements.

The disadvantage of longitudinal adjustments that involve frictional action is that particles can be produced by the relative displacement at the contact surfaces, i.e., in response to the friction of the mating surfaces and of the seal upon assembly of the objective lens. When working with image sensors that are unpackaged and are, therefore, freely oriented by the sensitive surface thereof toward the objective lens, the thus produced particles generally have a damaging, harmful effect, since, starting at a certain size within the range of the pixel size of the image sensor, for example a few micrometers, the particles can lead to unwanted cluster defects on the image sensor.

German Patent Application DE 10 2006 000 641 A1 describes mounting an objective lens in a lens holder, a clamping ring being set externally around the lens holder and being tensioned by reducing the diameter thereof However, such significant tensioning forces can lead to permanent deformations of the lens holder and thus to a defocussing. Furthermore, chipping can occur upon introduction of the lens system into the lens holder, and the chipped material can fall on the image sensor and thereby adversely affect image quality.

German Patent document DE 69 628 120 T2 describes anchoring haptics by fusion to an optical element. A microscope design provides for another objective lens to be additionally mounted to act as a collimator upstream of a microscope objective lens. A brass sleeve is used to mount the objective lens in a narrower section near the microscope objective lens. A crimping sleeve engages displaceably with the microscope body and has the purpose of supporting a laser delivery system that uses optical fiber cable. In this case, cylindrical sections make up the crimping sleeve.

SUMMARY

According to an example embodiment of the present invention, an imager module includes a clamping device that is elastically deformable and is provided and placed under tension between a sensor carrier, in particular a supporting device thereof, and the objective lens. A frictional engagement preferably takes place between areas of the outer surface of the objective lens and the clamping device; in particular, a friction locking is achieved between the outer surface of the clamping device and the supporting device.

In an example, the supporting device is configured, in particular, as a part of the sensor carrier, especially when the sensor carrier has a more complex form design. The supporting device can be a receiving depression, for example, having a receiving rim, so that the receiving rim forms a radially outer boundary, for example having radially inwardly facing supporting ribs as supporting means. The sensor carrier can be formed as an injection-molded part, for example as an MID (molded interconnect device) injection-molded part, on the one hand, to make possible a suitable three-dimensional contouring and, on the other hand, to provide a conductor strip for purposes of contacting the image sensor. In principle, however, an additional supporting device may also be mounted on the sensor carrier.

The clamping device is advantageously placed under tension orthogonally to the axis of symmetry of the objective lens. The clamping device can be designed, in particular, as a clamping sleeve, i.e., as a body that extends in the longitudinal direction of the axis of symmetry and has an essentially closed cross section. The non-tensioned tension sleeve can have a cylindrical form, for example; in principle, however, designs of the tension sleeve are also possible where the cross section is not circular or annular. The closed formation of the tension sleeve makes possible substantial elasticity and, in addition, also a radially outward sealing of the tubular objective lens.

The clamping device is placed under tension, in particular, from the interior thereof, by the objective lens received therein, and from the exterior thereof by the supporting means of the sensor carrier's supporting device.

The supporting means of the supporting device are preferably spaced apart circumferentially, in particular uniformly. The objective lens is placed into the clamping device by way of an insertion region that is preferably noncircular and features radially outwardly projecting bulged portions. These bulged portions form regions of the outer surface of the objective lens and rest against the inner surface of the clamping device, thereby tensioning it radially outwardly. One especially preferred embodiment provides that the supporting means be circumferentially, in particular centrally offset from the bulged portions; and so that the outer, inwardly acting tensioning of the clamping device acts in a manner that is circumferentially offset from the inner, outwardly acting tensioning.

Therefore, several advantages are already attained by the present invention. The objective lens is able to be fixed in position relative to the sensor carrier and thus relative to the image sensor by the tensioning carried out by the clamping device. The objective lens can be axially introduced into the clamping device, in particular the tension sleeve, without contacting an outer wall. Thus, an axial introduction and a focusing in response to adjustment of the objective lens in the axial direction are possible without frictional contact and without particles forming The deformed clamping device is also preferably initially received in the supporting device without any contact. The clamping device can be tensioned by the external action of force, the external action of force being first released once the objective lens is installed in the supporting device and longitudinally positioned.

The tensioning of the clamping device can also be used, in particular for centering the objective lens, so that the axis of symmetry of the objective lens lies centrally in the tension sleeve and in the supporting device. To this end, three circumferentially distributed supporting means and, offset therefrom, three convex bulged portions of the objective lens are provided, in particular.

For the manufacturing process, the clamping device is clamped from the outside, advantageously at more than two force-application regions, in particular with threefold symmetry. Upon releasing of the clamping device, there is a stress release of a cylindrical wall that receives the objective lens, thereby centering the cylindrical wall and the objective lens.

This type of radial tensioning, i.e., orthogonally to the axis of symmetry, permits a fixing in position following the focusing and without changing the longitudinal position along the axial direction.

This makes possible a manufacturing using relatively few parts, in particular one objective lens, one clamping device designed as a tension sleeve, for example, and one supporting device on the sensor carrier that can be realized, for example, by suitably form designing the sensor carrier with radially inwardly facing supporting ribs, for example.

The assembly, including focusing, can also be carried out using relatively few steps and with a high degree of precision. Relatively little outlay is entailed in the installation of a clamping device; for example, three clamping chucks can be symmetrically distributed, i.e., placed from the outside on the tension sleeve at 120° intervals around the axis of symmetry and then inwardly tensioned by application of a uniform force. The tensioning is carried out to the point where a gap remains between an inner surface of the tensioned tension sleeve and the outer surface of the insertion region of the objective lens, in particular an essentially uniform gap that can be within the mm range, for example. Once a suitable focusing is established, the clamping chucks can be released and thereby induce the radial clamping orthogonally to the axis of symmetry.

A sealing can advantageously be subsequently implemented between the tension sleeve and the objective lens and, in addition, between the tension sleeve and the supporting device. To improve the positional fixation, a material-to-material bond can be provided, for example by application of an adhesive agent. An adhesive agent is advantageously filled in that achieves both a material-to-material bond as well as a sealing. Thus, adhesive agent is introduced at an upper end of the tension sleeve, for example, in order to seal an axial gap between the tension sleeve and an upper part of the objective lens and, accordingly, at a lower region of the clamping sleeve, a radial seal and/or an axial seal is formed between the lower end of the clamping sleeve and the supporting device.

Thus, a cost-effective, precise and secure design is possible without degrading the performance characteristics of the image sensor.

As a general principle, the axis of symmetry of the objective lens can deviate from that of the image sensor. The optical axis of the imager module that is defined by the objective lens and the image sensor, does not entirely coincide with that of the objective lens.

By tilting the objective lens in the tension sleeve, for example, following the focusing, a tilting that affects imaging, i.e., a deviation of the axis of symmetry of the image sensor in comparison with that of the objective lens, can be carried out. Thus, in addition to a focusing along optical axis A, i.e., the Z direction, tilting can still take place orthogonally thereto, i.e., in the X and Y direction. To this end, a lower end of the objective lens may not have an exactly cylindrical form, rather a somewhat crowned convex form, for example can be configured with a downwardly curved taper. To this end, instead of contact lines, contact points are advantageously defined between the convex bulging portions of the objective lens and the tension sleeve, and a tilting is possible without any related contact, in particular within a clearance, i.e., of the gap between an insertion region of the outer surface of the objective lens and the sleeve. The clamping then takes place following the longitudinal focusing and the image plane correction.

DETAILED DESCRIPTION

Figure 1:
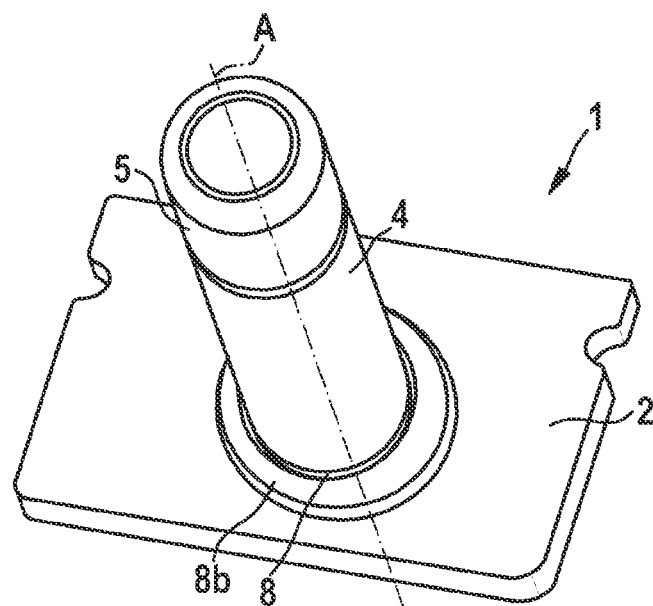
FIG. 1 shows a perspective view of an imager module according to an example embodiment of the present invention.

In accordance with the illustrations shown in FIGS. 1-5, an imager module 1 includes a sensor carrier 2, an image sensor 3 mounted thereon, an essentially tubular tension sleeve 4 made of elastic material, as well as an objective lens 5.

Sensor carrier 2 is used for the mounting and contacting of image sensor 3, as well as for accommodating tension sleeve 4. Sensor carrier 2 can be an MID (molded interconnect device), for example, an injection-molded circuit substrate. On bottom side 2b thereof, sensor carrier 2 is provided with lines or circuit-board conductors 6 which are used for contacting image sensor 3. A recess 7 (FIG. 4) is configured in sensor carrier 2. Using flip chip technology, image sensor 3 is oriented through recess 7 with the sensitive surface thereof toward objective lens 5 and contacted, for example, via soldered bumps (not shown) by circuit-board conductors 6. The sensor 3 can, in particular, be unpackaged and be directed through the recess by the sensitive surface thereof, without further covering; in principle, however, an assembly including a cover or chip housing is also possible.

Image sensor 3 and objective lens 5 define an optical axis, which, at a precise orientation, resides on an axis of symmetry A of objective lens 5. Therefore, it is initially assumed in the following that the optical axis resides on axis of symmetry A. Configured as a supporting device on top side 2a of sensor carrier 2 is a receiving depression 8, and recess 7 is formed approximately in the middle of receiving depression 8. Objective lens 5 advantageously does not rest on base 8a of receiving depression 8, but is rather axially spaced apart from base 8a. Receiving depression 8 is radially outwardly surrounded by a receiving rim 8b, which projects annularly from top side 2a, for example. In principle, however, there is no need to configure a bulge or a projection that protrudes beyond top side 2a for receiving rim 8b; what is relevant is accommodating tension sleeve 4 in receiving depression 8. Three uniformly circumferentially distributed supporting ribs 9 extend radially inwardly from receiving rim 8b and thereby narrow the free cross-sectional area of receiving depression 8.

Tension sleeve 4 is formed as a relatively thin-walled body, preferably of a metal, in particular steel, and is radially elastically deformable, e.g., inwardly toward the optical axis and the axis of symmetry A. The metal construction makes possible a thin wall for purposes of high elasticity. An outer radius r1 (FIG. 3, step 0) of outer surface 4a of tension sleeve 4 relative to axis of symmetry A in the undeformed state is greater than a distance r2 (FIG. 3, step II) of supporting ribs 9 to axis of symmetry A. An inner radius r3 (FIG. 3, step II) of receiving rim 8b is greater than outer radius r1 of undeformed tension sleeve 4.

Objective lens 5 features a lens mount 10 of plastic material, for example injection-molded plastic material, and one or more lenses 11 in lens mount 10, as indicated in FIG. 1. As shown in in FIGS. 2 and 4, lens mount 10 includes an insertion region 14 and an end region 15 that is higher, and the diameter of which is larger, than the insertion region 14; the type of form can be designed, in particular by an injection molding process, preferably with an injection direction along axis of symmetry A.

At least insertion region 14 is configured on the outer periphery thereof to be noncircular. For example, in the illustrated specific embodiment, insertion region 14 includes three convex bulged portions 16, for example in the form of a rounded triangle. Thus, a minimum radial extent r6 of insertion region 14 is smaller than a maximum radial extent r5 of insertion region 14 in the region of bulged portions 16. An inner radius r4 of inner surface 4b of tension sleeve 4 is preferably between minimum radial extent r6 of insertion region 14 and maximum radial extent r5 of insertion region 14.

Figure 3:
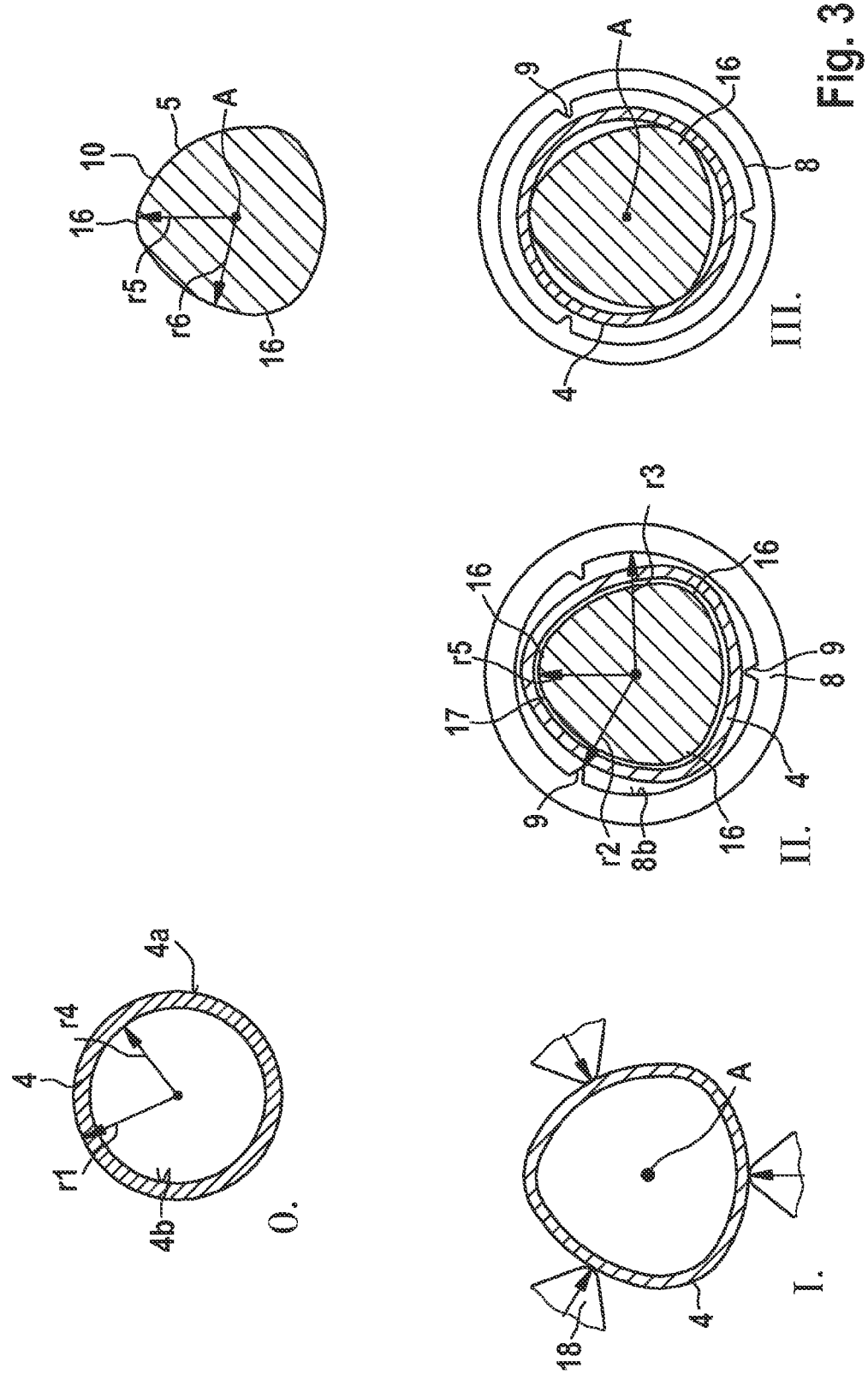
FIG. 3 provides an illustration corresponding to method steps, each in cross section orthogonally to the optical axis, according to an example embodiment of the present invention.
Figure 4:
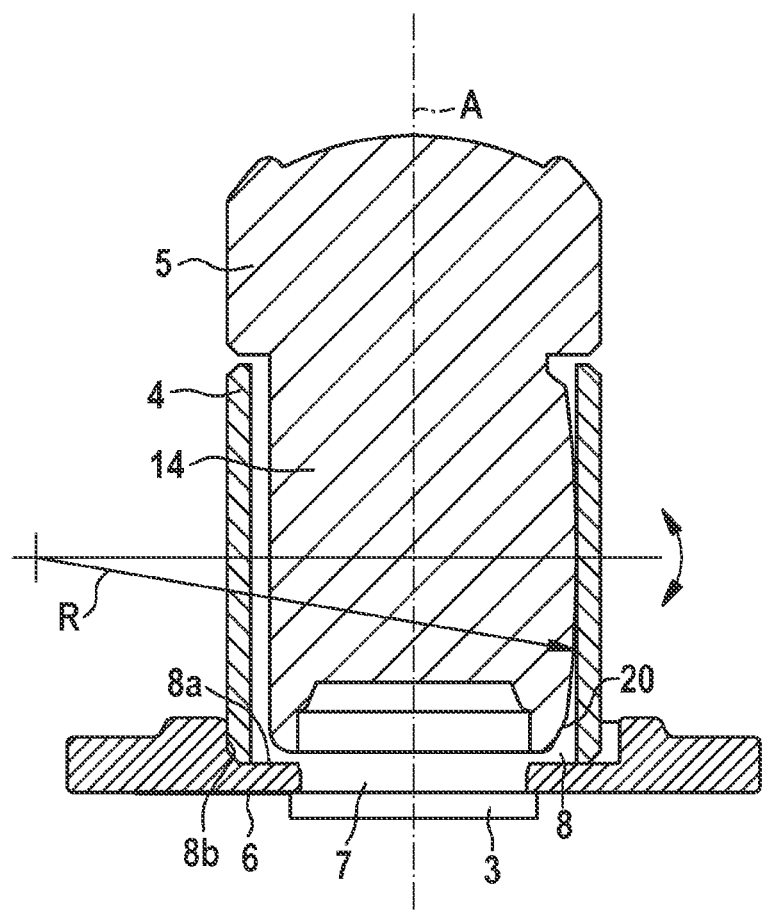
FIG. 4 shows a sectional view along the axis of symmetry before the adhesive agent is filled in, according to an example embodiment of the present invention.
Figure 5:
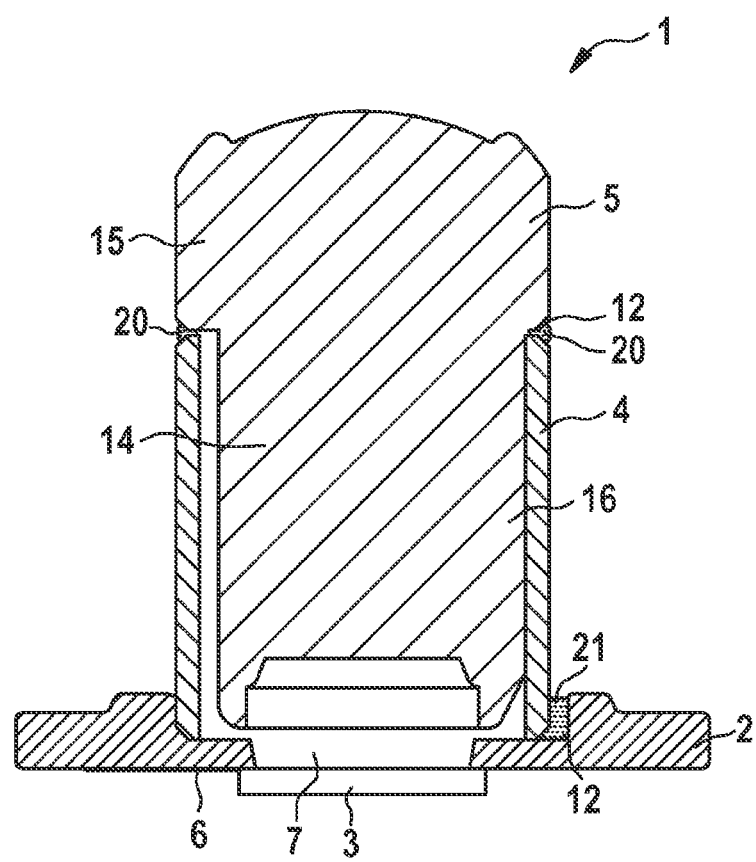
FIG. 5 shows a sectional view through the prefabricated imager module along the axis of symmetry, according to an example embodiment of the present invention.

To insert objective lens 5 by insertion region 14 of lens mount 10 into tension sleeve 4, FIG. 3, step I provides for tension sleeve 4 to be first pressed in radially, asymmetrically, preferably with the depicted threefold symmetry, by clamping chucks 18 indicated here exemplarily, from outer surface 4a thereof; thus, an external, radially inward force action follows for purposes of elastic deformation. To this end, clamping chucks 18 are preferably symmetrically distributed about axis of rotation A, i.e., in 120° intervals. Thus, tension sleeve 4 is pressed in radially and deformed into a threefold form, which advantageously essentially corresponds in form design to the outer shape of insertion region 14, i.e., in the illustrated specific embodiment, into a rounded triangle shape.

Following elastic deformation of tension sleeve 4 in step I, deformed tension sleeve 4 is guided in step II in the direction of optical axis A into receiving depression 8 between supporting ribs 9. Thus, deformed tension sleeve 4 is centrally positioned between supporting ribs 9 of receiving depression 8 of sensor carrier 2, in particular without contacting supporting ribs 9; at the same time, deformed tension sleeve 4 is set in an angular position relative to receiving rim 8b in a way that allows it, at the narrowed regions thereof, against which clamping chucks 18 rest, to be positioned in the region of supporting ribs 9. Thus, tension sleeve 4 is placed merely by its end face, i.e., by the bottom rim thereof, on base 8a of receiving depression 8; thus, no frictional action and chip formation, accompanied by material abrasion of tension sleeve 4, occurs during this process.

Figure 2:
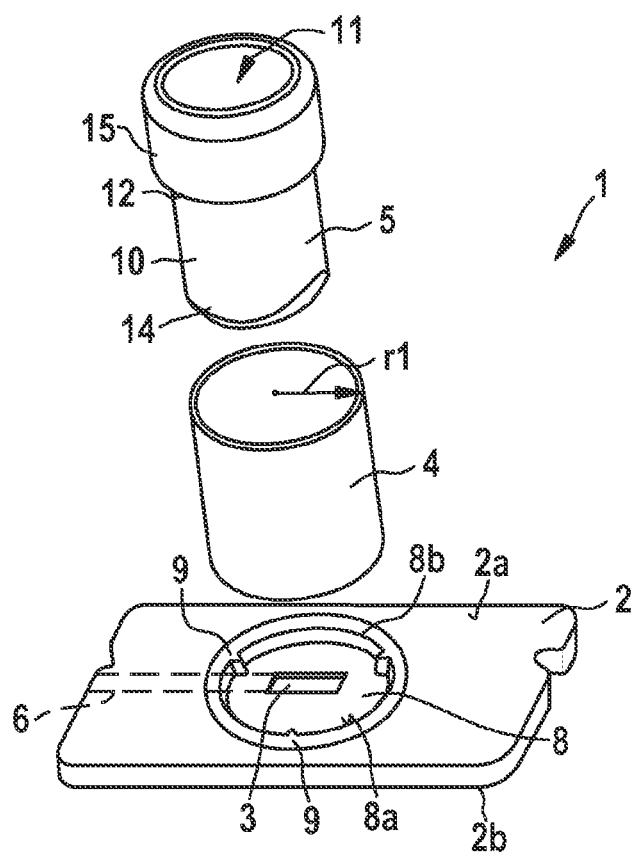
FIG. 2 shows an exploded view corresponding to FIG. 1.

Objective lens 5 is subsequently centrally inserted by insertion region 14 of lens mount 10 thereof in axial direction A, i.e., from above as shown in FIG. 2, into tension sleeve 4 in a matching angular position/rotational orientation; this insertion process takes place without any contact between objective lens 5 and tension sleeve 4, i.e., in particular without any contact between insertion region 14 and inner surface 4b of tension sleeve 4. The angular position of objective lens 5 is selected in a way that allows bulged portions 16 to lie approximately in the middle between supporting ribs 9 of receiving rim 8b. A clearance space gap 17 remains between insertion region 14 and inner surface 4b of tension sleeve 4. In particular, gap 17 can be uniform. Thus, no frictional process occurs between lens mount 10 and tension sleeve 4.

This longitudinal adjustment of objective lens 5 allows a focusing to be performed through analysis of image signals from image sensor 3, which captures a test pattern via objective lens 5, for example. Therefore, an optimum axial/longitudinal position of objective lens 5 is found, and objective lens 5 preferably does not reach base 8a of receiving depression 8.

A sensitive surface of image sensor 3 is exposed via recess 7 thereof to possibly occurring impurities. However, since no frictional contact occurs between lens mount 10 and tension sleeve 4, no chipping and particle abrasion that could cause particles to fall through recess 7 onto image sensor 3 occurs.

In accordance with FIG. 3, in a following step III, tension sleeve 4 is relieved, i.e., clamping chucks 18 are guided radially outwardly. Thus, due to the elasticity of the wall material thereof, tension sleeve 4 attempts to return to the round original form thereof that is shown in FIG. 3 in step 0. In response to elastic recovery and rebounding at outer surface 4a thereof, tension sleeve 4 moves here against three supporting ribs 9, and, at inner surface 4b thereof, tension sleeve 4 moves against bulged portions 16 of insertion region 14 of lens mount 10.

Following complete elastic recovery of tension sleeve 4, the configuration shown in FIG. 3, step III is reached where tension sleeve 4 rests by outer surface 4a thereof against three supporting ribs 9, and, between these contact points or contact areas at supporting ribs 9, insertion region 14 presses from the inside by bulged portions 16 thereof against inner surface 4b of tension sleeve 4. In accordance with FIG. 3, step III, tension sleeve 4 is, therefore, slightly resiliently tensioned.

It is thus achieved that lens mount 10 of objective lens 5 is fixed in position in tension sleeve 4, and that tension sleeve 4 is fixed in position on sensor carrier 2, namely by supporting ribs 9 of receiving depression 8 of sensor carrier 2 serving as a supporting device. This configuration results in a centering of objective lens 5 among supporting ribs 9, so that axis of symmetry A also forms optical axis A since image sensor 3 is centrally mounted between supporting ribs 9.

Objective lens 5 is thereby fixed in position and received. Furthermore, before the action of force is released, i.e., before clamping chucks 18 are removed, tilting of the image plane can be advantageously corrected, as is readily apparent from FIG. 4. To this end, lens mount 10 is advantageously not only curved in a crown shape convexly in the radial direction, but is also configured in a crown shape convexly in the axial direction. To this end, convex bulged portions 16 that serve for the radial bulging can be downwardly configured toward base 8a of receiving depression 8, in a crown shape convexly in the axial direction. This is indicated exemplarily in FIG. 4 by arrow R; accordingly, the rounding of this type of crowned convex form design is significantly greater than radii r1 through r5 described above. Thus, an axial curvature 20 is present in the plane that extends in parallel to optical axis A, i.e., the form design of insertion region 14, in particular bulged portion 16 thereof, is not uniform along optical axis and thus also not along axis of symmetry A.

Thus, in accordance with FIG. 3, step II, a slight tilting of objective lens 5 in tension sleeve 4 can take place, in particular within the clearance of objective lens 5 in tension sleeve 4, i.e., while gap 17 changes, but preferably without any contact.

Tilting can be carried out here in two directions orthogonally to axis of symmetry A; these tilting directions can be disposed orthogonally to one another; however, they can also be staggered by 120° in accordance with the threefold symmetry.

By tilting objective lens 5 in this manner, instances of minimal tilting that affect imaging are compensated, i.e., a slight tilting and skewing of image sensor 3 relative to the horizontal plane of optical axis A, i.e., a tilting of the normal of image sensor 3 relative to optical axis A of objective lens 4. The tension release and positional fixation subsequently follow in accordance with FIG. 3, step III.

Subsequently thereto, the configuration that has been fixed in position in this manner by tensioning is finally advantageously held in position by material-to-material bonding. To this end, in particular in accordance with FIG. 5, an adhesive agent 12 can be introduced between the upper end of tension sleeve 4 and a lower end of upper end region 15 of lens mount 10 and be used as an axial seal 20 for axial sealing; in addition, adhesive agent 12 is introduced between the lower end of tension sleeve 4 and sensor carrier 2, i.e., in the region of receiving depression 8, as sealing regions 21 forming a radial seal 21, and/or as an axial seal between tension sleeve 4 and receiving rim 8b. Thus, radial sealing regions 21 advantageously reside on base 8a and seal the radial intermediate space between outer surface 4a of tension sleeve 4 and receiving rim 8b.

Thus, a positional fixation by a material-to-material bond and, in addition, a sealing over the service life are achieved. In principle, there is no need for completely filling in the gap between lens mount 10 and tension sleeve 4 with adhesive agent 12.

Figure 7:
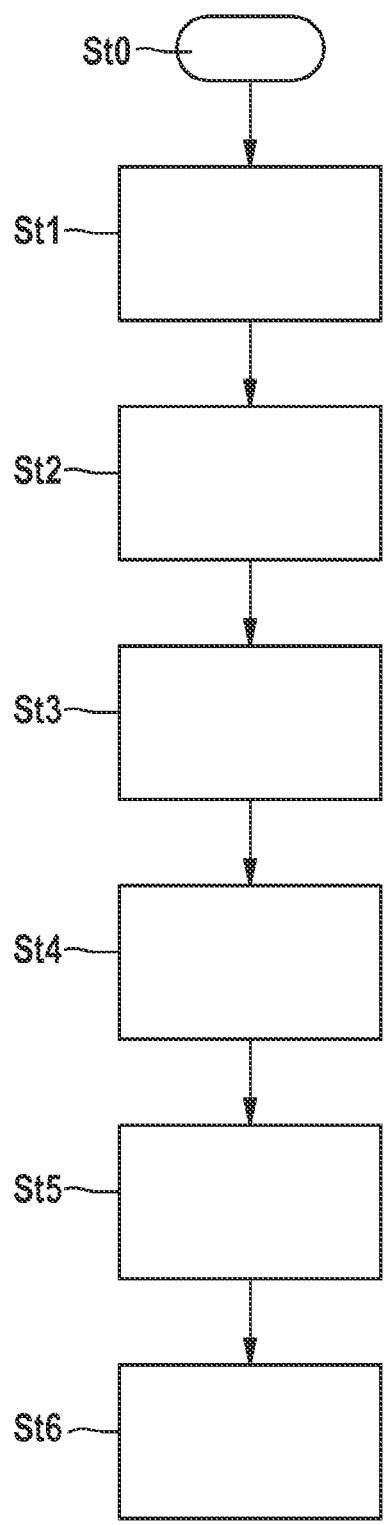
FIG. 7 shows a flow chart of a manufacturing method, according to an example embodiment of the present invention.

Thus, with reference to FIG. 7, a manufacturing method, starting at St0, according to an example embodiment of the present invention includes: elastically deforming tension sleeve 4 by applying rotationally symmetrically distributed clamping chucks 18 (St1), for the subsequent radial tensioning in accordance with FIG. 3, step I; axially inserting tension sleeve 4 into receiving depression 8 of sensor carrier 2, preferably onto base 8a of receiving depression 8 (step St2); axially introducing insertion region 14 of lens mount 10 of objective lens 5 into deformed tension sleeve 4 (step St3) in accordance with FIG. 3, step II, without any contact between inner surface 4a of tension sleeve 4 and objective lens 5; if necessary, tilting objective lens 5 in one or more planes that extend parallel to the optical axis (step St4) in order to correct a tilting that affects imaging, allowing image sensor 3 to be oriented along axis of symmetry A of objective lens 5, and a common optical axis defined by image sensor 3 and objective lens 5 to coincide with axis of symmetry A; relieving tension sleeve 4 by removing clamping chucks 18 (step St5), while tension sleeve 4 rebounds elastically, whereby the fixing in position is achieved by the clamping of tension sleeve 4 between supporting ribs 9 and convex bulged portions 16 of insertion region 14 of lens mount 10 of objective lens 5; and positional fixing of the components (step St6) by material-to-material bonding and sealing by filling in adhesive agent 12 as sealing regions 20, 21.

Figure 6:
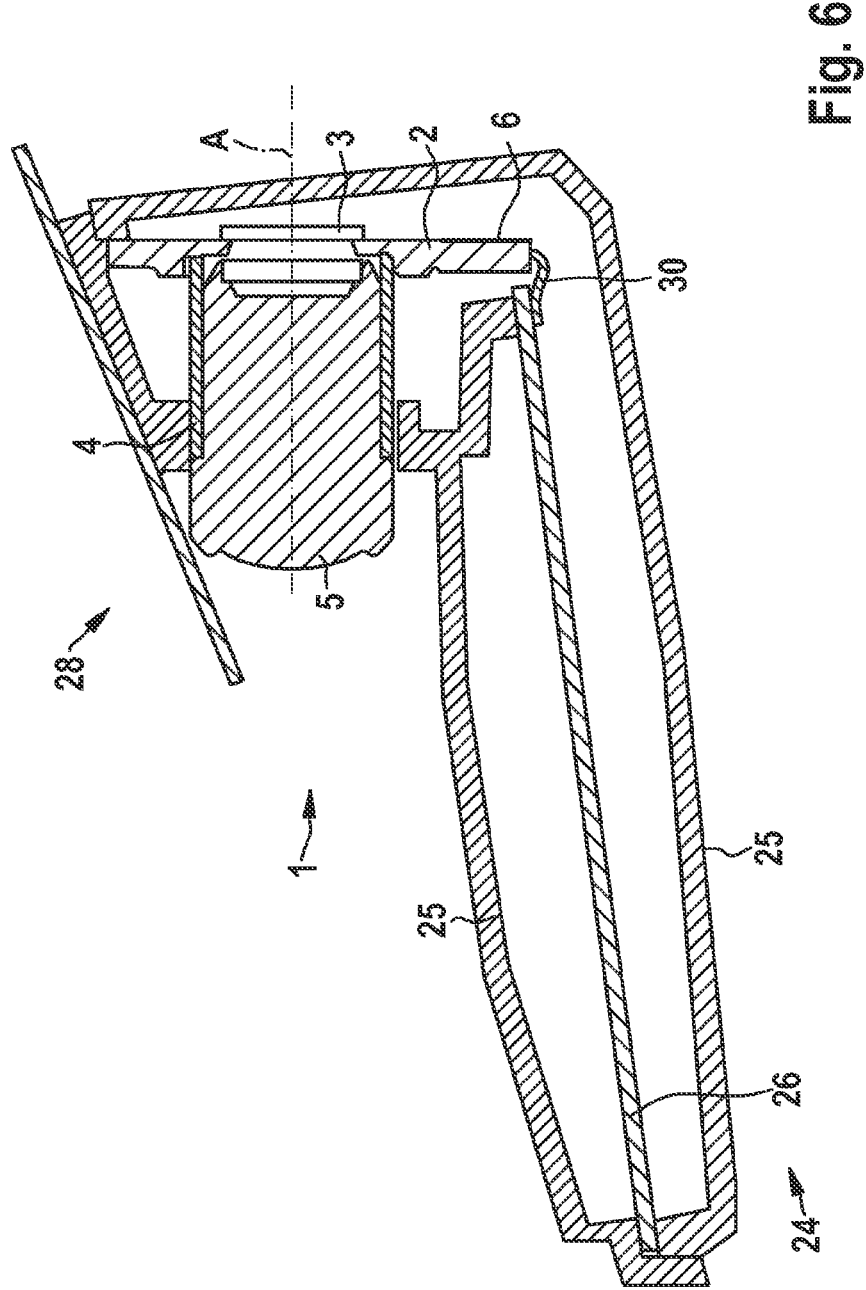
FIG. 6 shows a camera system including the imager module, according to an example embodiment of the present invention.

Imager module 1 designed in this manner can be installed in a camera system 24, for example as shown in FIG. 6, which includes a camera housing 25, a circuit substrate 26, for example a printed circuit board, for accommodating other electronic components, and for example including an additional camera mount to permit mounting in vehicle 28. Circuit-board conductors 6 of sensor carrier 2 are contacted by circuit substrate 26, for example via bond connections 30.

What is claimed is:

1. An imager module for a camera system, the imager module comprising:
   a sensor carrier including a supporting structure with supporting components;
   an image sensor accommodated on the sensor carrier;
   an objective lens having an insertion region with radial bulged portions; and
   an elastically deformable clamping device tensioned between the objective lens and the sensor carrier, wherein the clamping device is a tension sleeve which is received by the supporting structure and is inwardly tensioned asymmetrically in the radial direction by the supporting components of the supporting structure of the sensor carrier, wherein the tension sleeve receives the insertion region of the objective lens and is radially outwardly tensioned by the radial bulged portions of the insertion region of the objective lens, and wherein the bulged portions are circumferentially offset from the supporting components.

2. The imager module of claim 1, wherein the tension sleeve is elastically deformed by (a) regions of the outer surface of the objective lens and (b) the supporting structure, the supporting structure being in a plane that extends essentially orthogonally to at least one of an axis of symmetry of the objective lens and an optical axis of the imager module.

3. The imager module of claim 2, wherein the supporting structure is part of or mounted on the sensor carrier, and wherein the supporting components are circumferentially spaced apart and rest against an outer surface of the clamping device, radially tensioning the clamping device.

4. The imager module of claim 3, wherein the tension sleeve extends along an axis of symmetry of the objective lens, and wherein a cross section of the tension sleeve is closed and is elastically deformable in the radial direction orthogonally to the axis of symmetry of the objective lens.

5. The imager module of claim 3, wherein a form of the tension sleeve is essentially cylindrical, and an outer radius of the tension sleeve when the tension sleeve is not being tensioned is greater than a distance of the supporting structure to the axis of symmetry of the objective lens.

6. The imager module of claim 1, wherein the insertion region of the objective lens is noncircular and includes more than two radially outwardly projecting and circumferentially spaced apart bulged portions.

7. The imager module of claim 6, wherein an inner radius of the tension sleeve, when not tensioned, is greater than a minimum radial extent and smaller than a maximum radial extent of the insertion region of the objective lens.

8. The imager module of claim 6, wherein:
the tension sleeve is elastically deformed by(a) regions of the outer surface of the objective lens and (b) the supporting structure, wherein the supporting structure is in a plane that extends essentially orthogonally to at least one of an axis of symmetry of the objective lens and an optical axis of the imager module; and
the bulged portions are circumferentially offset from the supporting structure.

9. The imager module of claim 8, wherein the bulged portions are centrally offset from the supporting structure.

10. The imager module of claim 8, wherein the supporting structure includes three radially inwardly projecting supporting ribs, and the insertion region of the objective lens includes three bulged portions that are convexly outwardly directed in the radial direction, the bulged portions being arranged circumferentially between the support ribs.

11. The imager module of claim 10, wherein the bulged portions are circumferentially offset from the supporting ribs by 60°.

12. The imager module of claim 1, wherein the objective lens and the clamping device are joined by an adhesive agent that forms a seal.

13. The imager module of claim 12, wherein the seal is an axial seal between the objective lens and the clamping device.

14. The imager module of claim 2, wherein the clamping device and the supporting structure are joined by an adhesive agent that forms a seal.

15. The imager module of claim 14, wherein the seal is a radial seal between the clamping device and the supporting structure.

16. The imager module of claim 1, wherein an outer side of the objective lens is curved in an axial direction for tilting in the clamping device to correct a tilt of an image plane.

17. A camera module comprising:
a camera housing;
a circuit substrate; and
an imager module that includes:
a sensor carrier including a supporting structure with supporting components;
an image sensor accommodated on the sensor carrier;
an objective lens having an insertion region with radial bulged portions; and
an elastically deformable clamping device tensioned between the objective lens and the sensor carrier, wherein the clamping device is a tension sleeve which is received by the supporting structure and is inwardly tensioned asymmetrically in the radial direction by the supporting components of the supporting structure of the sensor carrier, wherein the tension sleeve receives the insertion region of the objective lens and is radially outwardly tensioned by the radial bulged portions of the insertion region of the objective lens, and wherein the bulged portions are circumferentially offset from the supporting components;
wherein the imager module and the circuit device are accommodated in the camera housing, and the image sensor is connected to the circuit substrate via circuit-board conductors formed on or in the sensor carrier.

18. The camera module of claim 17, wherein the camera module is integrated into a vehicle.

19. A method for manufacturing an imager module, the method comprising:
elastically deforming a tension sleeve by applying an external force in a radial direction, thereby asymmetrically deforming the tension sleeve in the circumferential direction;
axially inserting an objective lens, by way of an insertion region of the objective lens, into the deformed tension sleeve in a direction along an axis of symmetry of the objective lens without the objective lens contacting the tension sleeve;
at least partially reducing the applied external force, causing the tension sleeve to be inwardly tensioned asymmetrically in the radial direction by supporting components of a supporting structure of a sensor carrier, and to be radially outwardly tensioned by radial bulged portions of the insertion region of the objective lens, wherein the bulged portions are circumferentially offset from the supporting components.

20. The method of claim 19, wherein:
the axial insertion of the insertion region of the objective lens into the deformed tensioned sleeve adjusts a position of the objective lens along the axis of symmetry, thereby focusing the imager module; and
the method further comprises analyzing image signals from an image sensor attached to the sensor carrier obtained in each of a plurality of longitudinal positions of the objective lens to determine whether the imager module is correctly focused, in response to which the external force is released.

21. The method of claim 19, further comprising:
subsequent to the axial insertions, correcting an image plane by tilting the objective lens in the tension sleeve in at least one direction orthogonally to the axis of symmetry.

22. The method of claim 19, further comprising:
subsequent to the axial insertion, introducing at least one adhesive agent between the objective lens and the tension sleeve and between the tension sleeve and the supporting structure for a material-to-material bonding and sealing.

* * * * *